No. 874,536. PATENTED DEC. 24, 1907.
J. A. POTTER.
PROCESS OF MANUFACTURING WROUGHT IRON OR STEEL.
APPLICATION FILED DEC. 13, 1906.

2 SHEETS—SHEET 1.

WITNESSES:
O. Vreil
Hattie Levy

INVENTOR,
John A. Potter
BY
F. W. Wright.
ATTORNEY.

No. 874,536. PATENTED DEC. 24, 1907.
J. A. POTTER.
PROCESS OF MANUFACTURING WROUGHT IRON OR STEEL.
APPLICATION FILED DEC. 13, 1906.

2 SHEETS—SHEET 2.

WITNESSES:

INVENTOR,
John A. Potter,
BY
Francis W. Wright,
ATTORNEY.

UNITED STATES PATENT OFFICE.

JOHN A. POTTER, OF LOS ANGELES, CALIFORNIA.

PROCESS OF MANUFACTURING WROUGHT IRON OR STEEL.

No. 874,536.

Specification of Letters Patent.

Patented Dec. 24, 1907.

Application filed December 13, 1906. Serial No. 347,607.

*To all whom it may concern:*

Be it known that I, JOHN A. POTTER, a citizen of the United States, residing at Los Angeles, in the county of Los Angeles and State of California, have invented new and useful Improvements in Processes of Manufacturing Wrought Iron or Steel, of which the following is a specification.

This invention relates to a process of manufacturing wrought iron and all grades of steel, the object of the invention being to produce wrought iron and steel direct from iron ore, thereby greatly cheapening and simplifying its production.

Figure 1:
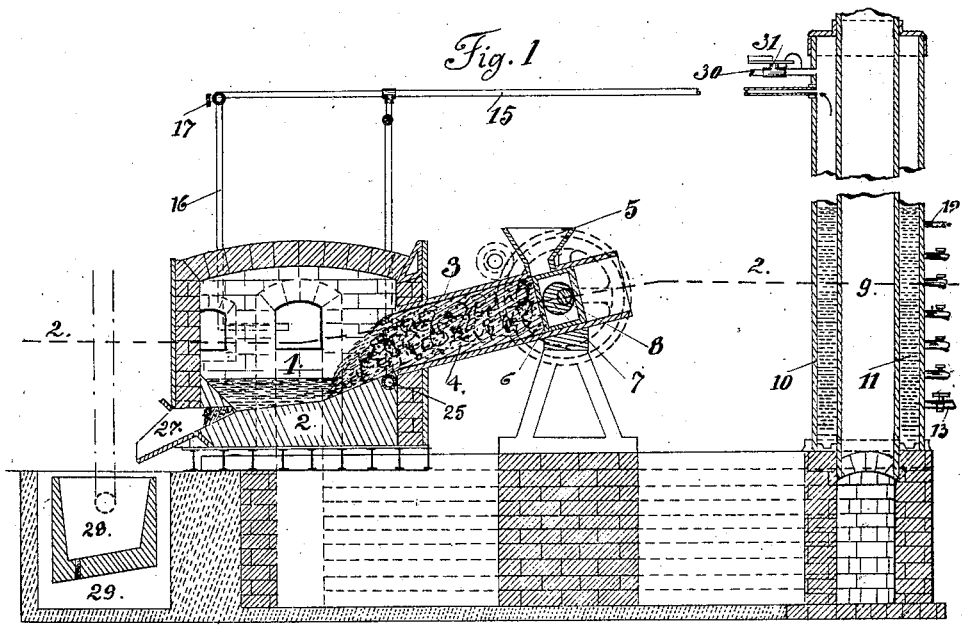
Figure 2:
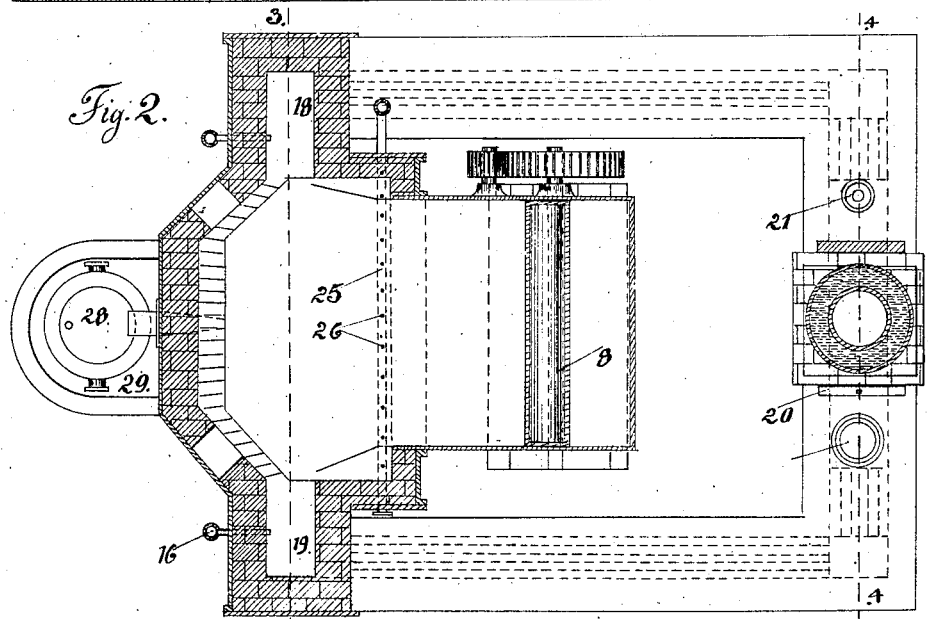
Figure 3:
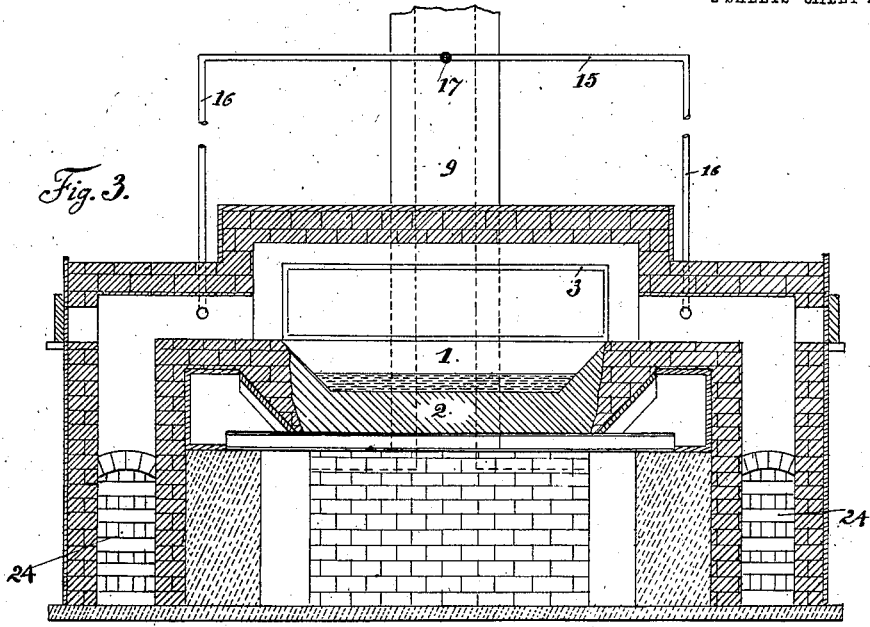
Figure 4:
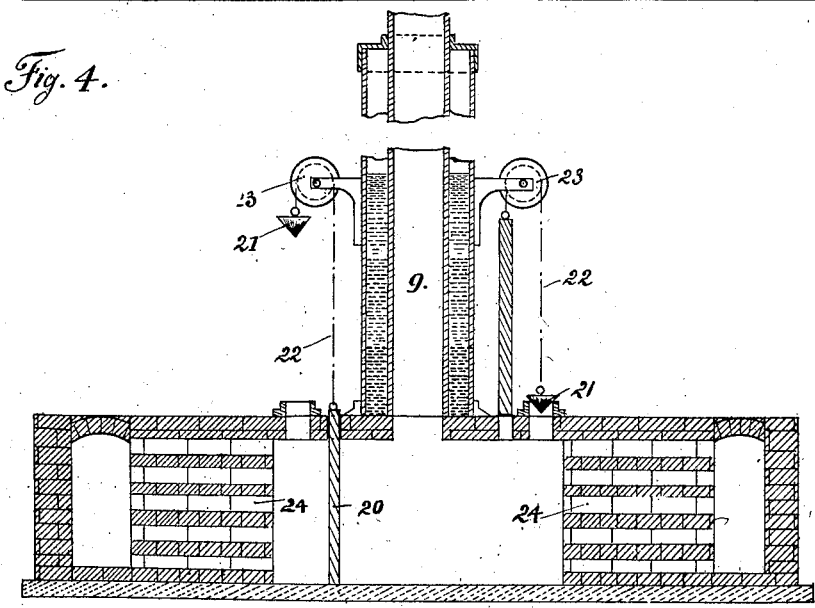

In the accompanying drawings, Figure 1 is a vertical longitudinal section of an apparatus by means of which my improved process may be carried out; Fig. 2 is a horizontal section of the same on the line 2—2 of Fig. 1; Fig. 3 is a vertical transverse section on the line 3—3 of Fig. 2 on a somewhat larger scale; Fig. 4 is a similar section on the line 4—4 of Fig. 2.

Referring to the drawings, 1 indicates a furnace, formed with a bed or hearth 2 of magnesite or other suitable material. Into this furnace is fed by an inclined chute or former 3 the pulverized ore 4. This ore may be mixed with suitable fluxes and reducing material such as pulverized limestone, fluorspar, asphaltum, slack coal, peat, vegetable matter, animal excreta and other organic refuse, coke, charcoal or other hydrocarbonaceous, or carbonaceous materials or fluxes, such as are capable of generating a hydrocarbonaceous or carbonaceous reducing gas to consume the oxygen in the ores and protect the freed particles of metal from oxidation, and are also adapted to form a binder to hold the ores intact, while protruding into the reducing and melting zones of the furnace. However, hydrocarbonaceous or carbonaceous materials may be omitted, and the pulverized ore and fluxes may be fed loose into the furnace, the front end of the body of ore and fluxes then finding its natural slope in the furnace melting chamber. The reducing agent would then be in a wholly gaseous form.

The mixture is fed by any suitable means into a hopper 5 discharging into the former 3, and is slowly advanced along said former by means of a ram 6 actuated by an eccentric 7 on a shaft 8. By this means, the front or advancing portion of the body of the mixture slowly passes out of the former 3, and on to the inclined bed 2 of the furnace, and its face is thus exposed to the melting heat obtained from the combustion of fuel in the furnace melting chamber.

The fuel used to obtain the melting heat is preferably fluid, and especially hot combustible gas. As a convenient means of obtaining the combustible gas for melting and reduction, there is here shown a specially constructed still. It is to be understood, however, that the method of obtaining the gas forms no part of my present invention. Around the stack 9, which carries off the products of combustion, is a casing 10, spaced therefrom to form an annular chamber or still 11. Crude oil, supplied to this chamber 11 by means of a pipe 12, is distilled by the heat of the stack, the asphaltum settling to the bottom of the still, the heavy oils resting above the asphaltum, while the medium and light oils are converted into gases. The liquid residues can be tapped off from time to time by pipes 13.

The gas distilled by the heat of the stack passes by a pipe 15 to one of two branches 16, leading to opposite sides of the furnace, a valve 17 being provided to change the flow of the gas from one of said branches to the other. Each branch terminates in front of the port 18 of a conduit 19, which conduits are used alternatively as air conduits and as passages for the waste gases. Said conduits lead to the stack 9, dampers 20 being adapted to be interposed between said passages and the stack, and air valves 21 being also provided to admit the air for combustion. The valve 21 and damper 20 on each side of the stack are connected by a chain 22 passing over a pulley 23 so that when the damper is open the valve is closed and conversely. Open work refractory material 24 is arranged in each conduit 19 so that said conduits can act as regenerators.

A pipe 25 extends transversely through the bed of the furnace at the top thereof and adjacent to the lower lip of the mouth of the former. Said pipe is formed with upwardly opening perforations 26, and is connected with the pipe 15 containing hot combustible reducing gas, derived from the still. On the opposite side of the furnace to the former is arranged the discharge spout 27 adapted to discharge the molten metal into the ladle 28 suspended in the pit 29. A relief pipe 30, having therein a safety valve 31, is connected with the oil still to permit the escape of the gas when the pressure becomes excessive.

The process is as follows:—After there has been generated in the stack, by any suitable means, heat sufficient to distil the crude oil, the gas distilled therefrom is conveyed by the pipe 15 and one of the branch pipes 16 to one side of the furnace, and is there burned by means of hot air passed through the regenerative channel 19 on the same side, the valve 21 at that side being open and the damper 20 closed. At the same time the charge of ore, fluxes and reducing materials, or ore and flux only, is fed into, along, and through the former, until the face of the charge is exposed to the melting action of the flames arising from the combustion of the fuel, which flames pass over the bed of the furnace from the port 18 and conduit 19 on that side, and thence to the stack 9, the damper 20 on that side being open. Also hot combustible reducing gas is forced through the perforations 26 in the pipe 25, and then through the front end of the charge in the furnace melting chamber. The heat from the furnace melting chamber, penetrating into the body of the mixture of ore and reducing materials, has the effect of distilling gas from said reducing materials, which gas consumes the oxygen of the ore and produces particles of pure metal, which particles, as the heat increases by the approach to the furnace, run together, and form drops of liquid wrought iron or steel. This result is also accomplished by the hot reducing gases admitted into the material through the pipe 25. The liquid metal runs into the furnace hearth, where it is allowed to accumulate to any desired extent, when it is graded to suit the desired purpose by adding metalloids, etc., to the liquid metal by the various means known to the art.

From the above it will be understood that, dependent upon the quality of the ore and other conditions, this process may be carried out in any one of four ways. First, the ore may be mixed with hydrocarbonaceous materials, lime, or other fluxes, and reduced by the gases derived from heating said ore and hydrocarbonaceous materials. Second, the ore may be mixed with fluxes and carbonaceous materials and reduced by the carbon gas derived from heating said ore and carbonaceous materials. Third, the ores may be mixed with fluxes only, without any reducing materials, and hot reducing gases may be forced through the heated ores and fluxes, for the purpose of performing the same functions as the gases distilled from the reducing materials, in the former methods. Or, fourth, both reducing materials together with reducing gases admitted through the perforated pipe may be adopted at the same time.

It will be readily understood that the hot reducing gases, whether derived from the distillation of the hydrocarbonaceous or carbonaceous materials mixed with the ore, or independently injected into the body of ore and caused to permeate therethrough, not only effects the consumption of the oxygen of the ore, but also continue to protect from oxidation the particles of iron reduced from the ore until they are brought to a temperature necessary to liquefy them.

Since the above action takes place near and at the point where the material is being discharged into the furnace melting chamber, and at very high temperatures, say 3000° F., and since, owing to the free draft through the furnace and up the stack, the reducing gas pressure within the reducing and fusing ore mixture does not differ materially from that of the atmosphere, and it results that the fusing and liquid iron has little tendency under these conditions to absorb hydrocarbon or carbon gas. In the ordinary iron blast furnace, the newly formed and fusing iron absorbs carbon from the carbon gas to the extent of one or two per cent., known as "fixed carbon", for the reason that the gas and iron are under considerable pressure within the furnace at the point where the iron is reduced from the ore and becomes liquid. In addition to this, about two per cent. of carbon called "graphitic carbon" is also absorbed by the liquid iron, owing to its contact under pressure with the highly incandescent coke which has not yet been gasified. Since, in the present process, the metal and the hydrocarbon or carbon gas are not subjected to pressure, and since hydrogen is a principal constituent of one of the reducing gases, substantially no carbon is absorbed by the iron.

In the modification of this process in which hydrocarbonaceous or carbonaceous materials are mixed with the ore, a small percentage of the resultant solid incandescent carbon will by contact become absorbed by the iron when fusing and liquefying. Hence, it may be preferable to use the modification just described when it is desired to produce high carbon steel, whereas, when wrought iron or soft steel is to be produced, it may be preferable to use to a greater extent the hot reducing hydrocarbon gases supplied direct in a gaseous form, or in cases where medium carbon steel is desired the carbon gas may be utilized either singly or in connection with hydrocarbonaceous or carbonaceous materials.

I claim:—

1. The process of manufacturing, direct from iron oxid ore, iron comparatively free from carbon, which consists in passing through a furnace the flames of combustion of fuel sufficient to melt the iron reduced by the hereinafter recited steps, feeding ore into the furnaces to expose the advancing surface of the ore to the heat of said flames, passing reducing gas through the ore and through its advancing surface into the furnace to reduce the ore, conducting away together the gaseous products of said combustion and reduction, and collecting the molten products of the reduction, substantially as described.

2. The process of manufacturing, direct from iron oxid ore, iron comparatively free from carbon, which consists in passing through a furnace the flames of combustion of fuel sufficient to melt the iron reduced by the hereinafter recited steps, continuously feeding ore into the furnace to expose the advancing surface of the ore to the heat of said flames, continuously passing reducing gas through the ore and through its advancing surface into the furnace to reduce the ore, continuously conducting away together the gaseous products of said combustion and reduction, and continuously collecting the molten products of the reduction, substantially as described.

In testimony whereof I have hereunto set my hand in the presence of two subscribing witnesses.

JOHN A. POTTER.

Witnesses:
M. J. McGARRY,
GLADYS BELL.